(12) United States Patent
Heller et al.

(10) Patent No.: US 6,307,007 B1
(45) Date of Patent: Oct. 23, 2001

(54) POLYCONDENSATION PRODUCTS AND THEIR USE AS DYEING AIDS

(75) Inventors: Jürg Heller, Oberwil (CH); Alec Tindal, Leeds (GB)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/308,167

(22) PCT Filed: Nov. 13, 1997

(86) PCT No.: PCT/IB97/01436

§ 371 Date: May 14, 1999

§ 102(e) Date: May 14, 1999

(87) PCT Pub. No.: WO98/22523

PCT Pub. Date: May 28, 1998

(30) Foreign Application Priority Data

Nov. 15, 1996 (CH) .................................................. 2831/96
Dec. 20, 1996 (GB) .................................................. 9626507

(51) Int. Cl.[7] ............................. C08G 73/00; D06P 1/52; D06M 11/00; D06M 13/00

(52) U.S. Cl. ........................... 528/310; 528/243; 528/254; 528/257; 528/268; 8/115.51; 8/115.6; 8/116.1; 8/536; 8/543; 8/556

(58) Field of Search .................................. 528/243, 254, 528/268, 257, 310; 8/536, 556, 543, 115.51, 115.6, 116.1

(56) References Cited

U.S. PATENT DOCUMENTS 4,764,585 * 8/1988 Heller et al. ......................... 528/233

FOREIGN PATENT DOCUMENTS

60252787 * 12/1985 (JP) .

* cited by examiner

Primary Examiner—P. Hampton-Hightower
(74) Attorney, Agent, or Firm—Scott E. Hanf

(57) ABSTRACT

New water-soluble polycondensation products are obtained by reaction of polyfunctional amines with cyanamide, its derivatives or polymers in the presence of sulfamic acid. They are excellent fixing agents which improve fastness properties of dyeings with substantive dyestuffs on cellulose fiber materials, paper, board and non-wovens.

13 Claims, No Drawings

POLYCONDENSATION PRODUCTS AND THEIR USE AS DYEING AIDS

The invention relates to water soluble polycondensation products which are produced by the reaction of polyfunctional amines with cyanamide or its derivatives and polymers.

BACKGROUND OF THE INVENTION

Such reaction products as well as their use for the improvement of fastness properties of dyeings with substantive dyestuffs have long been known. Thus DE-A-855 001 describes polycondensates obtained by heating a polyfunctional amine with cyanamide or a polymer or a derivative thereof in the absence of water, optionally in the presence of non-aqueous solvents, under elimination of ammonia. According to EP-A-0 431 423 these products contain, due to the process by which they are produced, water-insoluble by-products, a drawback which can be eliminated by carrying out the condensation between the polyfunctional amine and the cyanamide or its derivative or polymer in the presence of ammonium salts, such as ammonium chloride, sulfate, carbonate, formiate or acetate, in the absence or presence of a non-aqueous solvent, preferably in the presence of a solvent containing hydroxy groups and having a boiling point above 180° C. According to EP-A-0 692 511 an advantageous modification of this process consists of reacting the polyfunctional amine with the ammonium salt in the presence of a non-aqueous solvent and heating the protonised product thus obtained with the cyanamide component; this embodiment improves the safety of the process.

JP-A-60 252 787 describes wet fastness boosters for cellulose fiber dyed material, comprising the product of a polycondensation of an aliphatic diamine having 6 or more carbon atoms, preferably 1,6-hexanediamine or 2,2,4-trimethylhexamethylenediamine, or a salt thereof with an inorganic acid or an organic acid (such as formic, acetic and sulfamic acid), preferably the hydrochloride, with a guanidine compound or a salt thereof, preferably dicyandiamide, guanidine hydrochloride or guanidine sulfate. The resulting polycondensates are stated to have improved fastness-providing properties as compared with similar products obtained from other diamines.

SUMMARY OF THE INVENTION

It has been found that water-soluble condensation products with excellent properties are obtained if the reaction of amines with cyanamide, its derivatives or polymers is performed in the presence of 0.1 to 0.7 mol of sulfamic acid, or its salts, per mol of the cyanamide component.

DESCRIPTION OF THE PREFERRED EMBODIMENTS

The invention, therefore, relates to water-soluble basic polycondensation products obtained by the reaction of A) an amine of formula (I)

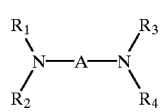

(I)

in which
A is an alkylene chain optionally interrupted by a hetero atom, and $R_1$–$R_4$ are independently selected from hydrogen, alkyl optionally substituted by OH, CN or $C_1$–$C_4$-alkoxy, provided that at least one of $R_1$ to $R_4$ is hydrogen, with B) cyanamide, its derivatives or polymers in a mol ratio of A:B=2:1 to 1:2, preferably 1:1 to 1:1.5 in the presence of C) 0.1 to 0.7 mol sulfamic acid, or its salts, per mole of B, at temperatures of 80 to 180° C., preferably 130 to 160° C., and their water-soluble salts obtained by neutralization with inorganic or organic acids usual in the dyeing technique.

Preferred amines of formula (I) are those in which
A is an $C_2$–$C_{20}$-alkylene chain optionally interrupted by O, S, NH or N—$C_1$–$C_4$-alkyl or substituted by OH, and
$R_1$–$R_4$ are independently hydrogen or $C_1$–$C_4$-alkyl, provided that at least one of $R_1$ to $R_4$ is hydrogen.

Examples of suitable polyfunctional amines A are 1,4-butanediamine, 1,6-hexanediamine, N-(2-aminoethyl)-1,3-propanediamine, dipropylenetriamine, N,N-bis-(2-aminopropyl)-methylamine, polyethylenimine and preferably polyethylenpolyamines such as triethylenetetramine, tetraethylenepentamine, pentaethylenehexamine and most preferably diethylene-triamine.

Suitable components B are cyanamide, dicyandiamide, guanidine and biguanidine. Dicyandiamide is preferred. Component C is preferably free sulfamic acid.

The reaction of component A with component B is performed in a mol ratio of 2:1 to 1:2, preferably 1:1 to 1:1.5 in the presence of 0.1 to 0.7 mol sulfamic acid at temperatures of 80 to 180° C., preferably 130 to 160° C., in the molten state whereby ammonia is split off. According to one possible variant of this process, Lewis acids, e.g. zinc chloride are used as catalysts.

It is also possible to use a suitable solvent, preferably one containing hydroxy groups and with boiling point above 180° C., to improve the stirrability of the mixture during condensation. In general, the condensation reaction is performed until no further ammonia is generated or is stopped after obtaining the desired level of viscosity. To counteract the influence of iron ions when performing the condensation in iron vessels, it is advisable to add a phosphonic acid sequestrant in appropriate amounts.

The reaction products are highly viscous liquids or solids with basic properties which dissolve in water to provide clear solutions. Preferably, they are transformed into water-soluble salts by neutralization with inorganic or organic acids as usual in the dyeing technique. Preferred acids are sulfuric, hydrochloric and acetic acid.

The basic polycondensation products or their salts according to the invention are useful for pretreatment or aftertreatment of textile fibers of hydroxy group or amino group containing materials which are dyed or printed with direct or reactive dyestuffs. Such textile fibers can also consist of mixtures of natural and synthetic fibers, e.g. mixtures of cellulose and polyester, polyacrylonitrile, polyamide or wool. The pretreatment of such fibers with the basic polycondensation products improves their dyeability and makes the dyeings more exhaustive, the aftertreatment improves the wet fastness of the dyeings and printings and more specifically the fastness to perspiration, to water and to washing.

The basic polycondensation products or their salts are also useful fixing agents for anionic dyes on paper, board and non-wovens. The treatment with such fixing agents results in better retention of the dye on the fibers or substrate, giving higher color yield and clearer backwater. In addition, the bleedfastness properties of such dyeings are superior to those of the unfixed dyeings. In comparison to fixing agents of the prior art, the advantages of the fixing agents according to the invention are brighter shades of the dyeings (less influence on the shade of the dyeings) and better lightfastness (less negative effect on this parameter).

The fixing agents according to the invention, when applied on paper, are also useful for improving colored two-sidedness with both anionic and cationic dyes (e.g. cationic direct dyes), and for improving color yield with cationic direct dyes where recycled raw materials are used or there are large amounts of filler or fines present.

For the treatment of the substrates with the fixing agents according to the invention, the substrates are treated with aqueous solutions of the basic polycondensation products or, preferably, their salts with inorganic or organic acids. The amounts of polycondensation products or their salts can vary in broad ranges. In general, amounts of 0.1 to 4% by weight, preferably 0.5 to 3% by weight, based on the weight of the substrate, are suitable to obtain the desired effect.

The treatment is performed by immersing the textile fibers either before or after the dyeing process in aqueous treatment baths containing the basic polycondensation products or preferably their salts with inorganic or organic acids. Such treatment of dyed or printed fiber material for improving the wet fastness is typically performed in an exhaustion process whereby the materials stay for 20 to 30 minutes in the aqueous bath containing the basic polycondensation product at pH values from e.g. 4 to 8, preferably 5.5 to 6.5 and temperatures from 20 to 70° C. Alternatively, the aftertreatment is performed continuously in that the aqueous bath is applied by padding and fixation takes place in conventional ways.

If paper, board or non-wovens are treated with the basic polycondensation product, the treatment is performed by addition of the fixing agent a few minutes before or after the dyeing of the substrate is finished and it is in general sufficient to agitate the mixture for a short time at room temperature before continuing the paper-making process.

Suitable dyestuffs for the dyeings which are improved by the treatment with the fixing agents according to the invention are referred to as direct dyes in the Colour Index, 3rd edition (1971), vol. 2 on pages 2005 to 2478 and as acid dyes on pages 1001 to 1562. Suitable reactive dyes are described in Venkataraman, The Chemistry of Synthetic Dyes, Volume VI, Reactive Dyes (Academic Press, New York, London 1972).

EXAMPLES

In the following examples parts are parts by weight.

Example 1

In a reaction vessel of 750ml, 126 parts dicyandiamide, 103 parts diethylenetriamine and 48.5 parts sulfamic acid are put into 100 parts diethyleneglycol and the mixture is made inert under nitrogen atmosphere. Over 2.5 hours with good stirring the mixture is heated to 150° C. and thereafter stirred for further 2.5 hours at 150° C. until a viscous honey-like mass is obtained from which 40 parts of ammonia is distilled off. After cooling the mixture to 135° C., 200 parts of ice is added and the basic product is neutralized with 24 parts sulfuric acid.

Example 2

In a reaction vessel of 750ml, 92.4 parts dicyandiamide, 103 parts diethylenetriamine and 97 parts sulfamic acid are put into 150 parts diethyleneglycol. Over 2.5 hours, with stirring, the mixture is heated to 160° C. and thereafter stirred for further 4 hours at 160° C., during which 34 parts of ammonia is distilled off. After cooling the mixture to 135° C., 65 parts of ice is added and the basic product is neutralized with 16 parts hydrochloric acid (36%).

Example 3

In a reaction vessel of 750 ml, 105 parts dicyandiamide, 103 parts diethylenetriamine and 12.1 parts sulfamic acid are put into 100 parts diethyleneglycol. Over 2.5 hours, with stirring, the mixture is heated to 160° C. and thereafter stirred for further 30 minutes at 160° C., during which 36 parts of ammonia is distilled off. After cooling the mixture to 135° C., 190 parts of ice is added and the basic product is neutralized with 46 parts sulfuric acid.

Example 4

In a reaction vessel of 750 ml, 92.4 parts dicyandiamide, 103 parts diethylenetriamine, 48.5 parts sulfamic acid and 1.4 parts zinc chloride are put into 100 parts diethyleneglycol. Over 2.5 hours, with stirring, the mixture is heated to 150° C. and thereafter stirred for further 2.5 hours at 150° C., during which 38 parts of ammonia is distilled off. After cooling the mixture to 135° C., 150 parts of ice is added and the basic product is neutralized with 28 parts sulfuric acid.

Example 5

In a reaction vessel of 750 ml, 105 parts dicyandiamide, 103 parts diethylenetriamine and 24.2 parts sulfamic acid are put into 150 parts diethyleneglycol. Over 3 hours, the mixture is heated to 150° C. and thereafter stirred for further 5 hours at 150° C., during which 40 parts of ammonia is distilled off. After cooling the mixture to 135° C., 150 parts of ice is added and the basic product is neutralized with 31 parts glacial acetic acid.

Example 6

By the same process as used in previous examples, 105 parts dicyandiamide, 103 parts diethylenetriamine and 48.5 parts sulfamic acid are put into 200 parts diethyleneglycol. Over 2 hours, the mixture is heated to 150° C. and thereafter stirred for further 7 hours at 150° C., during which 40 parts of ammonia is distilled off. After cooling to 120° C., the mixture is diluted with 300 parts water and the basic product is neutralized with 18 parts glacial acetic acid.

Application Examples

Example A 100 parts of cotton are dyed with 1.35% by weight dyestuff C.I. Direct Yellow 162 (commercial form) corresponding to 1/1 standard depth. Immediately after the dyeing and rinsing process, the cotton fibers are treated during 20 minutes at 40° C. in a bath containing 3 parts of the product according to example 1 in 997 parts of soft water. After removing the bath, the cotton fibers are rinsed once with fresh water. A yellow dyeing with excellent wet fastness (washing and water) is obtained. Analogous results are obtained with the products according to examples 2 to 6 and with the dyestuffs of the following table used on cotton or regenerated cellulose. The indicated amounts in % by weight correspond in all cases to 1/1 standard depth.

TABLE

| Dyestuff | amount in % by weight | |
|---|---|---|
| | for cotton | for viscose |
| Direct Yellow 162 | 1.35 | 1.40 |
| Direct Red 83:1 | 1.75 | 2.35 |
| Optisal Red R SGR | 1.40 | 1.60 |
| Direct Red 227 | 2.70 | 1.95 |
| Direct Violet 66 | i.30 | 0.80 |
| Direct Blue 71 | 1.00 | 0.90 |
| Direct Blue 77 | 1.35 | 1.30 |
| Direct Blue 85 | 1.30 | 1.20 |
| Direct Blue 90 | 1.60 | 1.55 |
| Direct Blue 251 | 1.25 | 1.15 |
| Solar Royalblue 3RL | 2.65 | 2.45 |
| Direct Brown 240 | 1.50 | 2.55 |
| Direct Black 118 | 2.20 | 2.05 |

Example B

The aftertreatment of the dyeings according to example A can also be performed as follows:

The dried substrate is immersed into an aqueous solution of 40 g/l of the products according to examples 1 to 6, the liquid is squeezed off to obtain a pick-up of 80% and the substrate dried at 120° C. Dyeings with excellent wet fastness (washing and water) are obtained.

Example C

A furnish (stock suspension of paper fibers) of:

50% Bleached Softwood

50% Bleached Hardwood is prepared at 2.5% consistency and at freeness of 20 degrees Schopper-Riegler (ISO 5267/1).

To this fiber suspension under constant stirring, a solution of a typical anionic dye is added (in this case Colour Index Direct Yellow 148: 1) at a concentration according to the final depth of shade required, for example 1/2 Standard Depth. After 5 minutes the fixing agent of Example 1 is added. The amount added depends on the final result required in terms of bleedfastness properties, color yield and backwater clarity. In this case 3% is added by weight of fiber. After a further 1 minute of stirring, the dyed fiber suspension is diluted to a consistency of 1%. A sheet of paper is produced from this suspension using a typical method, in this case a hand mold is used, but a mechanical sheet former is equally as good (ISO 5269/1 or ISO 5269/2).

The sheet is then placed on filter paper and pressed between felts at a pressure of 10 tons (per sq. m) for two minutes. The paper is then removed and dried in a flat bed dryer at 90° C. for 10 minutes. The backwater from the dyeing is collected and compared with the backwater of an unfixed dyeing. The paper shade and depth is compared with another sheet which has been prepared with the same dye and a traditional fixing agent (Cartafix F liquid). The color of the sheet prepared with the new chemical is found to be significantly brighter and the lightfastness is better. The bleedfastness properties are also found to have improved compared to an unfixed dyeing and the backwater is much clearer than for the unfixed dyeing. Typical methods of measuring the parameters described above are:

Bleedfastness method EN 646: 1994

Backwater rating EN 20105-A03: 1992

Lightfastness EN 20105-B02: 1992

Color Difference BS 6923: 1988

Analogous results are obtained with the products according to examples 2 to 6.

What is claimed is:

1. Basic polycondensation products, and their water-soluble salts, obtained by neutralization with inorganic or organic acids usual in dyeing techniques, produced by the steps of:

providing an amine (A) of formula (I)

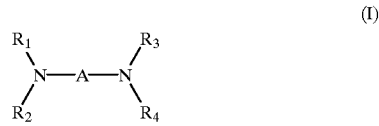

in which

A is an alkylene chain which optionally can include a hetero atom, and $R_1$–$R_4$ are independently selected from hydrogen, alkyl optionally substituted by OH, CN or $C_{1-4}$-alkoxy, provided that at least one of $R_1$ to $R_4$ is hydrogen;

providing a cyanamide, its derivatives or polymers (B) in mol ratio of A:B=2:1 to 1:2, reacting said amine (A) with said cyanamide, its derivatives or polymers (B) in the presence of 0.1 to 0.7 mol sulfamic acid, or its salts, per mole of B, at temperatures of 80 to 180° C.

2. Polycondensation products according to claim 1 having a mole ratio of A:B of 1:1 to 1:1.15.

3. Polycondensation products according to claim 1 where said amine of formula (I) is used as component A, in which A is an $C_2$–$C_{20}$-alkylene chain which optionally can include O, S, NH or N—$C_1$–$C_4$-alkyl or substituted by OH, and $R_1$–$R_4$ are independently hydrogen or $C_1$–$C_4$-alkyl, provided that at least one of $R_1$ to $R_4$ is hydrogen.

4. Polycondensation products according to claim 1 where diethylenetriamine is used as component A.

5. Polycondensation products according to claim 1 where dicyandiamide is used as component B.

6. Polycondensation products according to claim 1 where free sulfamic acid is used as component C.

7. Polycondensation products according to claim 1 where the reaction takes place at temperatures of 130–160° C.

8. Polycondensation products according to claim 7 where the reaction takes place in the presence of hydroxy group containing solvents with a boiling point above 180° C.

9. Polycondensation products according to claim 1 where the reaction takes place in the presence of hydroxy group containing solvents with a boiling point above 180° C.

10. A dyeing process which includes the step of:
    applying the polycondensation products according to claim 1 as additives in dyeing processes.

11. A pretreatment process for dyeings of substantive dyestuffs on cellulose fiber materials which includes the step of:
    applying the polycondensation products according to claim 1 as a pretreatment for dyeings of substantive dyestuffs on cellulose fiber materials.

12. A fixing process for dyeings of substantive dyestuffs on cellulose fiber materials which includes the step of:
    applying the polycondensation products according to claim 1 as a fixing agent for dyeings of substantive dyestuffs on cellulose fiber materials.

13. A fixing process for dyeings of substantive dyestuffs on paper, board and non-wovens which includes the step of:
    applying the polycondensation products according to claim 1 as a fixing agent for dyeings of substantive dyestuffs on paper, board and non-wovens.

* * * * *